J. E. McCRAY.
LOADING DEVICE.
APPLICATION FILED JAN. 7, 1909.
987,809.
Patented Mar. 28, 1911.
3 SHEETS—SHEET 1.
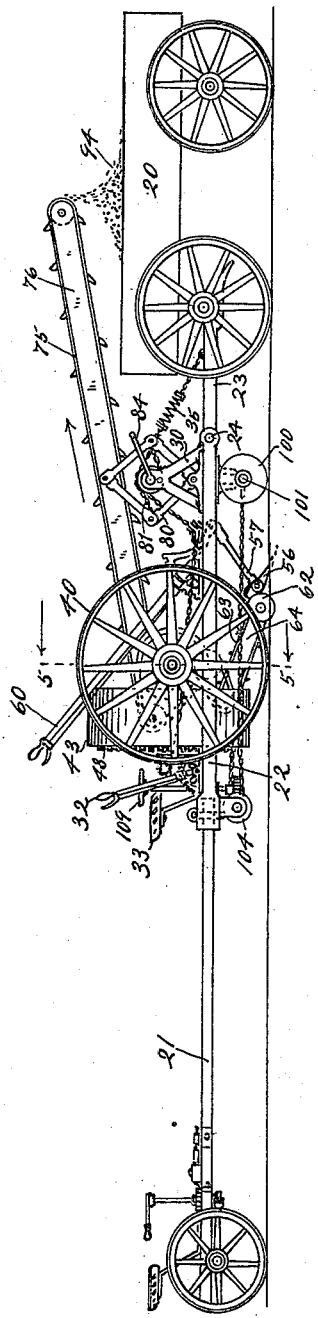
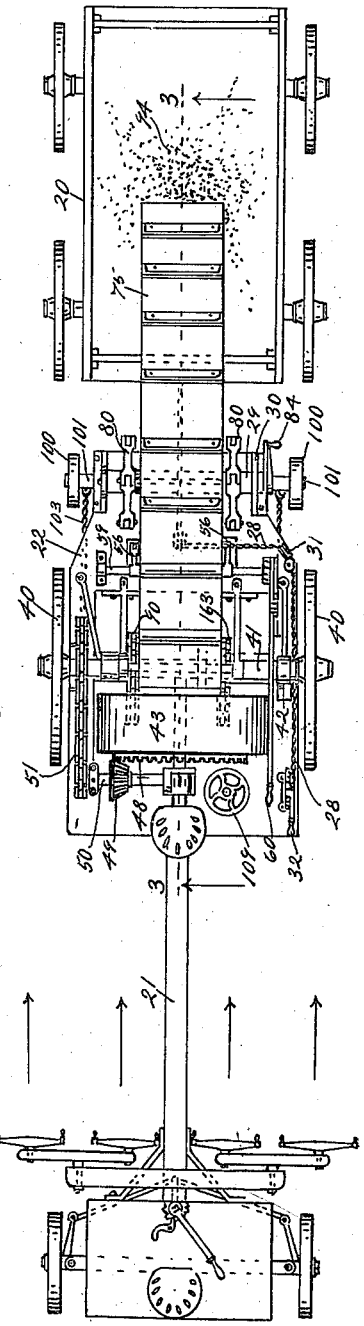
WITNESSES:
INVENTOR.
John E. M? Cray.
BY
ATTORNEY.

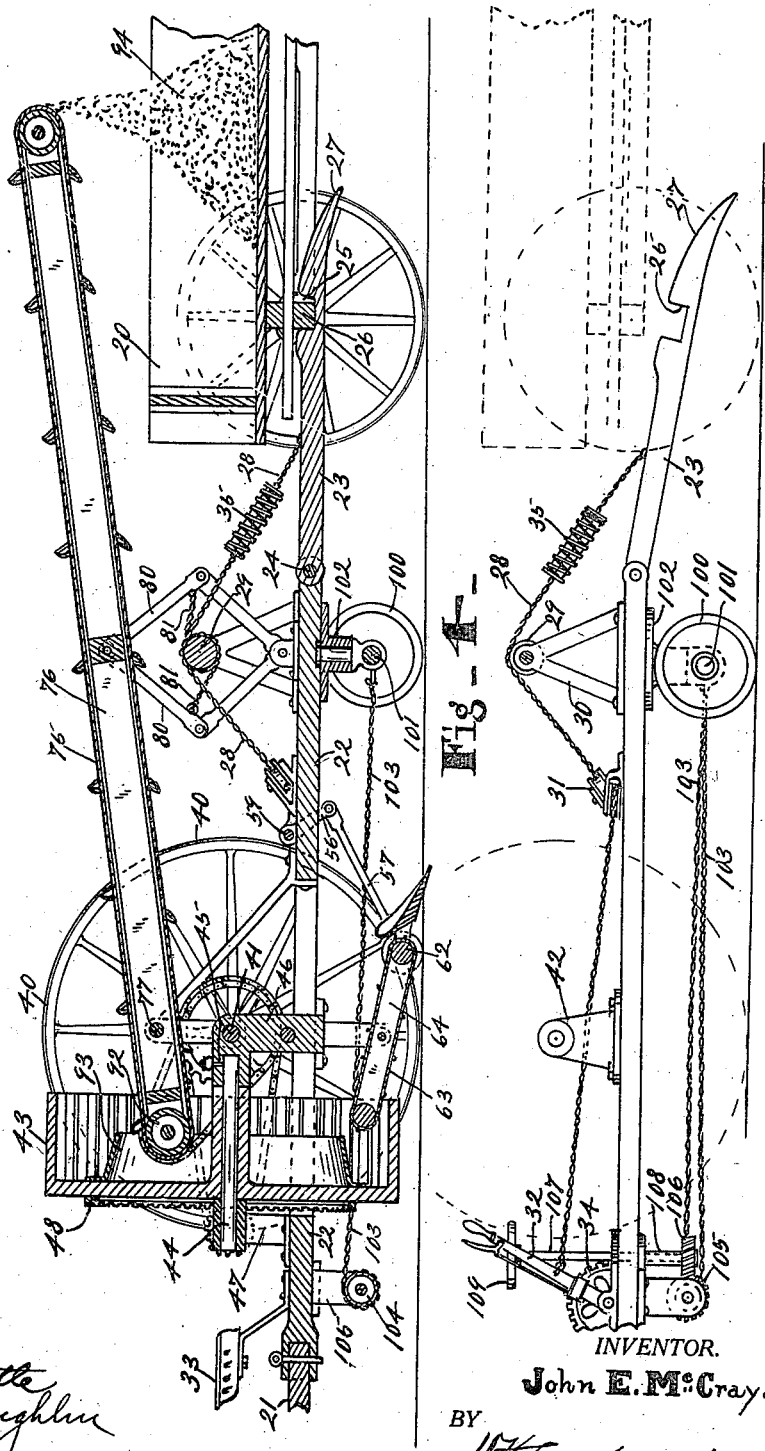

J. E. McCRAY.
LOADING DEVICE.
APPLICATION FILED JAN. 7, 1909.
987,809.
Patented Mar. 28, 1911.
3 SHEETS—SHEET 3.
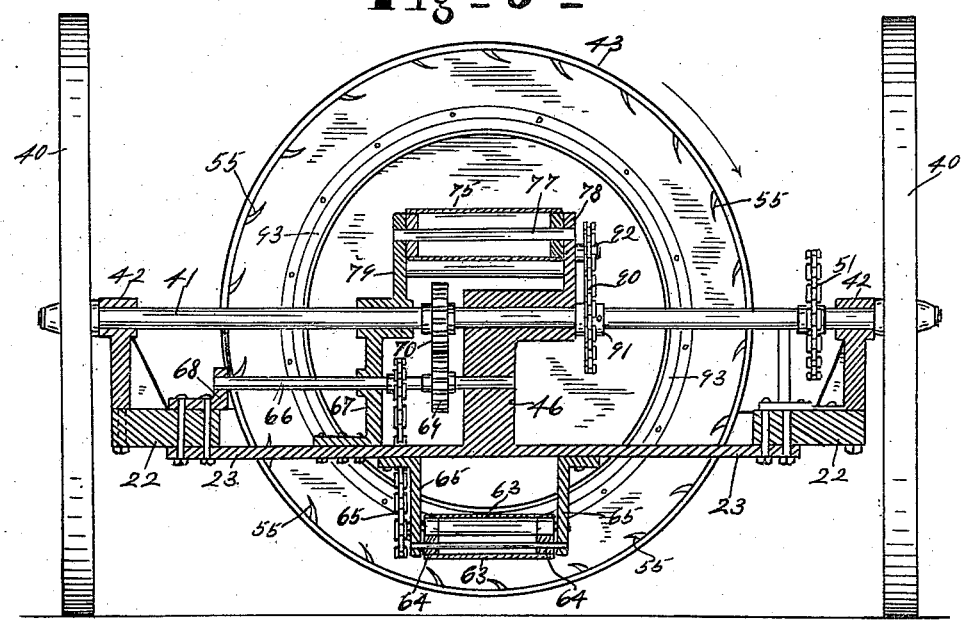
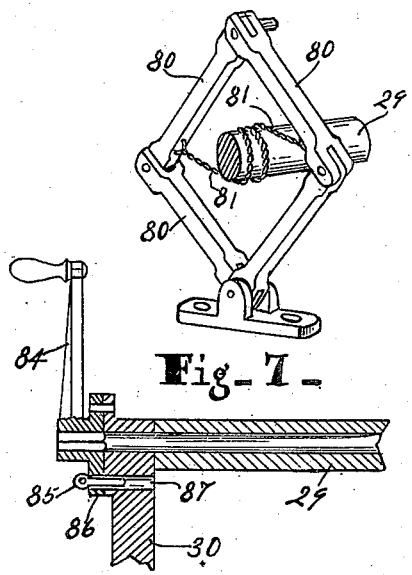
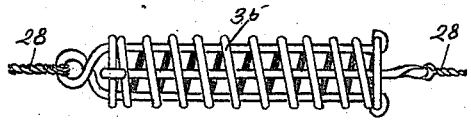
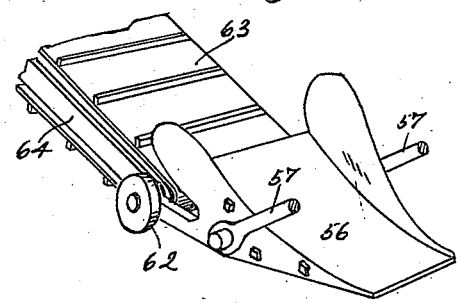
WITNESSES:
W. M. Gentle
O. M. McLaughlin
INVENTOR.
John E. McCray.
BY
V. H. Lockwood
ATTORNEY.

UNITED STATES PATENT OFFICE.

JOHN E. McCRAY, OF HAUGHVILLE, INDIANA.

LOADING DEVICE.

987,809.  Specification of Letters Patent.  Patented Mar. 28, 1911.

Application filed January 7, 1909. Serial No. 471,054.

*To all whom it may concern:*

Be it known that I, JOHN E. MCCRAY, of Haughville, county of Marion, and State of Indiana, have invented a certain new and useful Loading Device; and I do hereby declare that the following is a full, clear, and exact description thereof, reference being had to the accompanying drawings, in which like letters refer to like parts.

The object of this invention is to improve the construction and operation of that class of excavating machines which simultaneously excavates the material, elevates the same and loads it into a wagon whereby it is hauled away.

One feature of this invention consists in combining with such traveling excavator, a transversely revolving wheel for elevating the dirt and discharging it upon a conveyer or other means for receiving it. To this end said transversely mounted elevating wheel is open on its front side and is annular with buckets on the internal periphery of the wheel, and a conveyer extends forwardly from a point within the upper part of the wheel in a position to receive the dirt as it drops from the upper part of the wheel. This conveyer deposits the dirt in a wagon hitched to the forward end of the excavating machine and means is mounted on the frame of the machine for vertically adjusting said conveyer.

Another feature of the invention consists in the means shown for charging the wheel with dirt. There is a plow or scraper that separates the dirt from the ground and which moves in advance of the wheel and, if it be far enough in advance, the dirt is moved from the plow or scraper rearwardly to the wheel and discharged within the same.

Another feature of the invention consists in providing a vehicle connected to the rear of the excavating machine to which a team may be hitched for pushing the machine forward, and this pushing means coöperates with a pulling means; namely, a wagon in advance of the machine and connected therewith. Therefore one team pulls the wagon and helps pull the machine while another team pushes the machine.

Another feature of the invention consists in means for automatically hitching the machine to the wagon and manually operated means for releasing the same.

The full nature of the invention will be understood from the accompanying drawings and the following description and claims.

In the drawings Figure 1 is a side elevation of the excavating apparatus. Fig. 2 is a plan view thereof. Fig. 3 is a central vertical section through the excavating machine and the rear half of the wagon, with the machine hitched to the wagon in condition for operation. Fig. 4 is a side elevation of the frame of the machine and the rear half of the wagon, the latter being in dotted lines, showing the parts after the machine had been disengaged from the wagon. Fig. 5 is a vertical transverse section on the line 5—5 of Fig. 1. Fig. 6 is a perspective view of the conveyer supporting means. Fig. 7 is a vertical transverse section through a part of said means. Fig. 8 is a detailed view of the spring support for the connection between the wagon and machine. Fig. 9 is a perspective view of the forward part of the means for picking up the dirt from the ground and conveying it to the elevating wheel.

In detail the drawings herein show an excavating machine, a wagon 20 in front thereof to receive the dirt and haul it away, and a push-cart 21 at the rear thereof to assist in propelling the machine. The push-cart shown is adapted for four horses and the forward end of the tongue is removably connected with the rear part of the frame 22 of the excavating machine, whereby the power exercised by the team on the push-cart will be applied to the machine for pushing the same forwardly. The team hitched to the wagon also assists in advancing the excavating machine. There is a connecting bar 23 pivoted at its rear end at 24 to the forward end of the frame 22 of the machine. Said connecting bar has a notch 25 near its forward end adapted to engage the rear axle 26 of the wagon so that the wagon will pull the machine. The forward end of the connecting bar 23 is beveled at 27 on its upper side so it will slip under the axle of the wagon when the wagon is backed into place for loading. The connecting bar is held in engaging position by a cable 28 extending from the upper side of said bar over the shaft 29 mounted on the stands 30 and about wheel 31 to a hand lever 32 at the rear part of the machine near the seat 33. A notched segment 34 locks the lever 32 in position. A yielding spring construction 35 is imposed between the ends of said cable 28 so that said cable forms a yielding support for the bar 23. After the wagon is backed into place for loading the lever 32 is drawn rearwardly which couples the wagon to the machine as shown in Fig. 3. After the wagon has been loaded the cable 28 is relaxed, thus disengaging the connection 23 from the wagon. The frame 22 is carried by a pair of wheels 40 and the axle 41 passes through the stands or bearings 42. Between said traction wheels 40 an elevating wheel 43 is mounted transversely of the machine, as seen in Fig. 5. A spindle 44 is mounted at one end in the rearward extension 45 of the upper end of the post 46 and at the other end in the bearing post 47. The elevating wheel is annular with its forward side open and its rear side closed. On its rear side it has an annular rack 48 which is engaged by a pinion 49 on the shaft 50. This shaft is driven by a sprocket chain 51 running over a sprocket wheel on the outer end of the shaft 50 and the sprocket wheel 53 on the axle 41. The elevating wheel 43 has in its internal periphery buckets 55 arranged so as to hold the dirt deposited at the bottom of the wheel and carry the same to the top of the wheel where it will be discharged by gravity.

The elevating wheel is charged with dirt by the following means: A scoop or a plow 56 is drawn by rods 57 extending forwardly and upwardly and connecting with the cranks 58 on the rod 59 to which a long hand lever 60 is secured, whereby said scoop or plow can be elevated or lowered. Wheels 62 are mounted at the rear end of the said scoop or plow so as to run on the ground, and the dirt is carried from the plow 56 rearwardly to the wheel 43 by the conveyer 63 on the frame 64, that at its forward end is supported by the plow 56 and at its rearward end by the arm 64 extending downwardly from the frame 23, see Fig. 5. This conveyer is driven by a sprocket chain 51 running over the shaft 66, which shaft is mounted in the bearing posts, 46, 67, and 68. Said shaft 66 is driven by a gear 69 thereon meshing with the gear wheel 70 on the axle 41. The conveyer 63 projects at its rear end into the lower part of wheel 43 so as to discharge the dirt thereon, see Fig. 3. The wheel 43 discharges the dirt on a long forwardly extending horizontal conveyer 75 operating on a frame 76 mounted at its rear end on the rod 77 in the stands 78 and 79 extending up from the stands 46 and 67, see Fig. 5. Said conveyer frame is supported substantially by toggles 80 that extend up from each side of the frame 24 and are contracted or expanded for elevating or lowering the conveyer by cables 81 surrounding the shaft 29 which is actuated by the handle 84, see Fig. 7, and locked by the key 85 passing through a hole in the flange 86 connected with the handle and a hole 87 in the stand 30. The conveyer 75 is actuated by the sprocket chain 90 running from the sprocket wheel 91 on the axle 41 to a sprocket wheel on the drum 92 at the rear end of the conveyer frame. The rear end of the conveyer projects within the upper part of the wheel so the dirt will be discharged thereon and an annular tapering guard plate 93 is secured to the inner surface of the rear wall of the wheel 43 and projects beyond and above the rear end of the conveyer 75. All dirt that falls on the plate 93 rolls on the conveyer 75, and the conveyer discharges the dirt 94 into the wagon.

The forward end of the excavating machine is guided by the following means: A pair of wheels 100 is mounted on the ends of the axle 101 that is centrally mounted in the lower part of the bearing 102 extending down from the frame 23 so that the axle 101 is oscillatory. It is oscillated for steering the machine by cables 103 extending therefrom rearwardly to a drum 104 mounted in brackets 105. Said drum 104 is actuated by worm gears 105 and 106, the former on a drum and the latter on a vertical steering rod 107 mounted on the bracket 108 and having a steering wheel 109 on its upper end. When the wheel 109 is turned in either direction it will correspondingly actuate the axle 101 and steer the machine.

What I claim as my invention and desire to secure by Letters Patent is:

1. An excavating machine including a vehicle having a frame and traction wheels, an elevating wheel mounted between the traction wheels transversely of the vehicle, means for taking up the material from the ground and depositing the same on the wheel, a conveyer extending longitudinally of the vehicle, means on the frame for supporting the conveyer so that the rear end thereof will receive the material elevated by the wheel, and a receptacle attached to said frame and located under the forward end of said conveyer for receiving the material therefrom.

2. The combination of a wagon having a rear axle, an excavating machine, and a spring elevated connection with the forward part of the excavating machine having a notch in its upper side to engage said axle, whereby the wagon will draw the excavating machine.

3. The combination of a wagon having a rear axle, an excavating machine, and a spring elevated connection with the forward part of the excavating machine having a notch in its upper side to engage said axle, the forward end of said connection being beveled on its upper side whereby it will tend to couple with the axle of the wagon when the wagon and the excavating machine are brought together.

4. The combination of a wagon having a rear axle, an excavating machine, a spring elevated connection with the forward part of the excavating machine having a notch in its upper side to engage said axle whereby the wagon will draw the excavating machine, and a means for lowering and elevating said connection.

5. The combination of a wagon, an excavating machine hitched behind the same and including a frame, a substantially horizontal conveyer operating longitudinally of said machine, means mounted on the frame for adjustably supporting the conveyer with the forward end over the wagon, and transversely operative means for elevating the material and depositing the same upon the rear end of said conveyer.

In witness whereof, I have hereunto affixed my signature in the presence of the witnesses herein named.

JOHN E. McCRAY.

Witnesses:
STEWART A. COULTER,
OSCAR M. KAELIN.

---

Copies of this patent may be obtained for five cents each, by addressing the "Commissioner of Patents, Washington, D. C."